(12) United States Patent
Kawatani et al.

(10) Patent No.: US 6,782,015 B1
(45) Date of Patent: Aug. 24, 2004

(54) LASER SURVEY INSTRUMENT

(75) Inventors: Nobuaki Kawatani, Ibaragi (JP); Sadao Murano, Tokyo (JP); Mitsuhiro Matsumoto, Tokyo (JP)

(73) Assignees: PENTAX Corporation, Tokyo (JP); Pentax Precision Co., Ltd, Tokyo (JP)

( * ) Notice: Subject to any disclaimer, the term of this patent is extended or adjusted under 35 U.S.C. 154(b) by 178 days.

(21) Appl. No.: 09/649,232

(22) Filed: Aug. 29, 2000

(30) Foreign Application Priority Data

Sep. 1, 1999 (JP) .......................... 11-247306

(51) Int. Cl.[7] .................................................. H01S 3/10
(52) U.S. Cl. ........................... 372/24; 372/9; 372/29.01
(58) Field of Search ........................... 372/9, 24, 29.01; 172/4.5

(56) References Cited

U.S. PATENT DOCUMENTS

| | | | |
|---|---|---|---|
| 4,062,634 A | | 12/1977 | Rando et al. |
| 5,499,262 A | * | 3/1996 | Nakata ........................ 372/108 |
| 5,818,645 A | * | 10/1998 | Whaley et al. ............. 359/668 |
| 5,825,555 A | * | 10/1998 | Oono et al. .................. 359/668 |
| 5,978,148 A | * | 11/1999 | Oono et al. .................. 359/668 |
| 5,991,102 A | * | 11/1999 | Oono et al. .................. 359/820 |
| 6,435,283 B1 | * | 8/2002 | Ohtomo et al. .............. 172/4.5 |
| 6,443,235 B1 | * | 9/2002 | Ohtomo et al. .............. 172/4.5 |

FOREIGN PATENT DOCUMENTS

| | | |
|---|---|---|
| DE | 19716710 | 11/1997 |
| JP | 2829912 | 9/1998 |

OTHER PUBLICATIONS

English Language Abstract of DE 197 16 710.

* cited by examiner

*Primary Examiner*—Don Wong
*Assistant Examiner*—Leith A Al-Nazer
(74) *Attorney, Agent, or Firm*—Greenblum & Bernstein, P.L.C.

(57) ABSTRACT

A laser survey instrument includes a laser source; a beam waist position varying optical system having a movable lens group through which a laser beam emitted from the laser source passes, so that the movement of the movable lens group in an optical axis direction causes the beam waist position of the laser beam to vary; a rotatable head portion from which the laser beam transmitted through the beam waist position varying optical system is emitted; a reciprocating-scan angle setting device for setting a reciprocating-scan angle of the rotatable head portion in accordance with position data of the movable lens group of the beam waist position varying optical system; and a head portion controller for reciprocally moving the head portion by the reciprocating-scan angle.

12 Claims, 6 Drawing Sheets

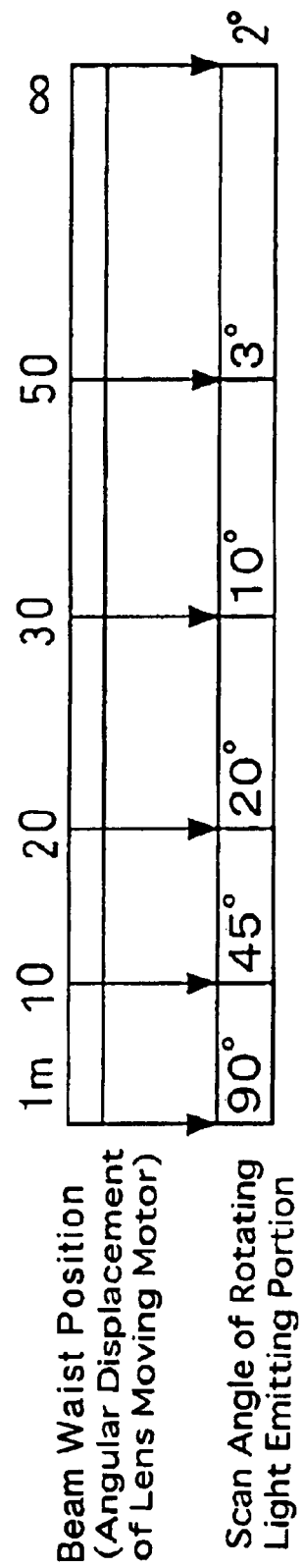

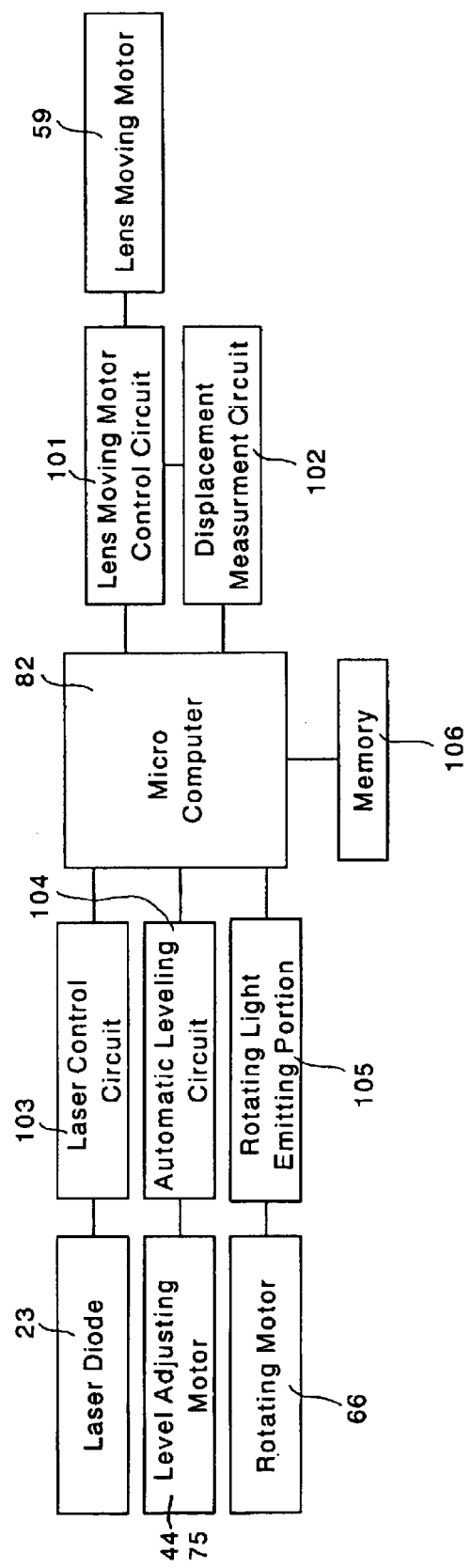

LASER SURVEY INSTRUMENT

BACKGROUND OF THE INVENTION

1. Field of the Invention

The present invention relates to a laser survey instrument which emits a visible laser beam.

2. Description of the Related Art

In a survey instrument (laser planer) in which a scanning laser beam is rotated to project a plane beam in the vertical or horizontal direction, the beam can be easily viewed at a close distance, but it is difficult to view the beam at a long distance since the amount of light per unit length is reduced. One solution to enhance the visibility is to reciprocally rotate the head within a predetermined angle range without rotating the same over the angle of 360 degrees to thereby increase the amount of light per unit length. For example, Japanese patent No. 2,829,912 discloses a visible laser survey instrument in which a scanning motor is rotated in the forward and reverse directions so that the reciprocating-scan angle set by a reciprocating-scan angle setting circuit is identical to the reciprocating-scan angle detected by a reciprocating-scan angle detection circuit.

In this known laser survey instrument, if the reciprocating-scan angle is too small, it is impossible to obtain a sufficient length of linear beam at a close distance. Conversely, if the reciprocating-scan angle is too large, the amount of light at a long distance is reduced, so that it is difficult for an operator to view the beam. Therefore, in order to obtain an optimum amount and length of beam, it is necessary for an operator to manually vary the reciprocating-scan angle in accordance with the distance.

SUMMARY OF THE INVENTION

It is an object of the present invention to provide a laser survey instrument in which an optimum reciprocating-scan angle of the laser beam is automatically obtained in accordance with the distance of the laser beam at which a plane is drawn by the laser planer.

In general, a conventional laser survey instrument is provided with a adjusting device which adjusts the beam waist position of the laser beam (at which the minimum beam diameter is obtained) to make the beam waist position coincident with an object (target). In the basic concept of the present invention, the reciprocating-scan angle is varied in accordance with the beam waist position, so that the visibility of the beam can be enhanced, regardless of the reciprocal scan length.

According to another aspect of the present invention, a laser survey instrument is provided, including a laser source; a beam waist position varying optical system having a movable lens group through which a laser beam emitted from the laser source passes, so that the movement of the movable lens group in an optical axis direction causes the beam waist position of the laser beam to vary; a rotatable head portion from which the laser beam transmitted through the beam waist position varying optical system is emitted; a reciprocating-scan angle setting device for setting a reciprocating-scan angle of the rotatable head portion in accordance with position data of the movable lens group of the beam waist position varying optical system; and a head portion controller for reciprocally moving the head portion by the reciprocating-scan angle.

In an embodiment, the reciprocating-scan angle setting device utilizes a table stored in a memory in which a relationship between the position of the movable lens group of the beam waist position varying optical system and the reciprocating-scan angle of the head portion controller is stored, so that a corresponding reciprocating-scan angle can be selected based on the position data of the movable lens group.

In an embodiment, the reciprocating-scan angle setting device calculates a reciprocating-scan angle of the head portion based on the position data of the movable lens group of the beam waist position varying optical system in accordance with a predetermined relationship between the position of the movable lens group and the reciprocating-scan angle of the head portion, the predetermined relationship being stored in a memory.

Preferably, the beam waist position varying optical system includes a motor, and a feed screw mechanism which is driven by the motor to move the movable lens group.

The position data of the movable lens group of the beam waist position varying optical system can be detected in accordance with either the rotational angular displacement of the motor, or the rotational angular displacement of a rotating member rotated by the motor.

In an embodiment, the beam waist position varying optical system is accommodated in a hollow shaft member, and the rotatable head portion is provided at the top of the hollow shaft member.

In an embodiment, the beam waist position varying optical system includes a positive lens group which is immovable, and a negative lens group which is movable.

Alternatively, in another embodiment, the beam waist position varying optical system includes a positive lens group which is movable and a negative lens group which is immovable.

According to another aspect of the present invention, a laser survey instrument is provided, including a hollow shaft member having an axis; a rotatable head portion provided at the top of the hollow shaft member to be rotatable about the axis of the hollow shaft member; a beam expander accommodated in the hollow shaft member, the beam expander comprising at least a positive lens group and a negative lens group, wherein one of the positive and negative lens groups comprises a movable lens group which is movable in the optical axis direction; a laser source to emit a laser beam through the beam expander and rotatable head portion, wherein the laser beam exits from the rotatable head portion in a direction perpendicular to the axis of the hollow shaft member; a position detector which detects the position of the movable lens group of the beam expander; a reciprocating-scan angle setting device for setting the reciprocating-scan angle of the rotatable head portion in accordance with position data of the movable lens group detected by the position detector; and a head portion controller for reciprocally moving the head portion by a set reciprocating-scan angle set by the reciprocating-scan angle setting device.

In an embodiment, the reciprocating-scan angle setting device utilizes a table stored in a memory in which a relationship between the position of the movable lens group of the beam expander and the reciprocating-scan angle of the head portion controller is stored, so that a corresponding reciprocating-scan angle can be selected based on the position data of the movable lens group.

Preferably, the movable lens group of the beam expander is driven by a motor and a feed screw mechanism.

In an embodiment, the position detector of the movable lens comprises an annular position detector which detects the rotational angular displacement of the motor or the rotational angular displacement of a rotating member rotated by the motor.

The present disclosure relates to subject matter contained in Japanese Patent Application No. 11-247306 (filed on Sep. 1, 1999) which is expressly incorporated herein by reference in its entirety.

BRIEF DESCRIPTION OF THE DRAWINGS

The present invention will be discussed below in detail with reference to the accompanying drawings, in which:

FIG. 5 is a schematic diagram showing a relationship between a beam waist position, an angular displacement of a lens moving motor, and a reciprocating-scan angle; and FIG. 6 is a block diagram of a control circuit of a laser survey instrument according to the present invention.

DESCRIPTION OF THE PREFERRED EMBODIMENTS

Figure 1:
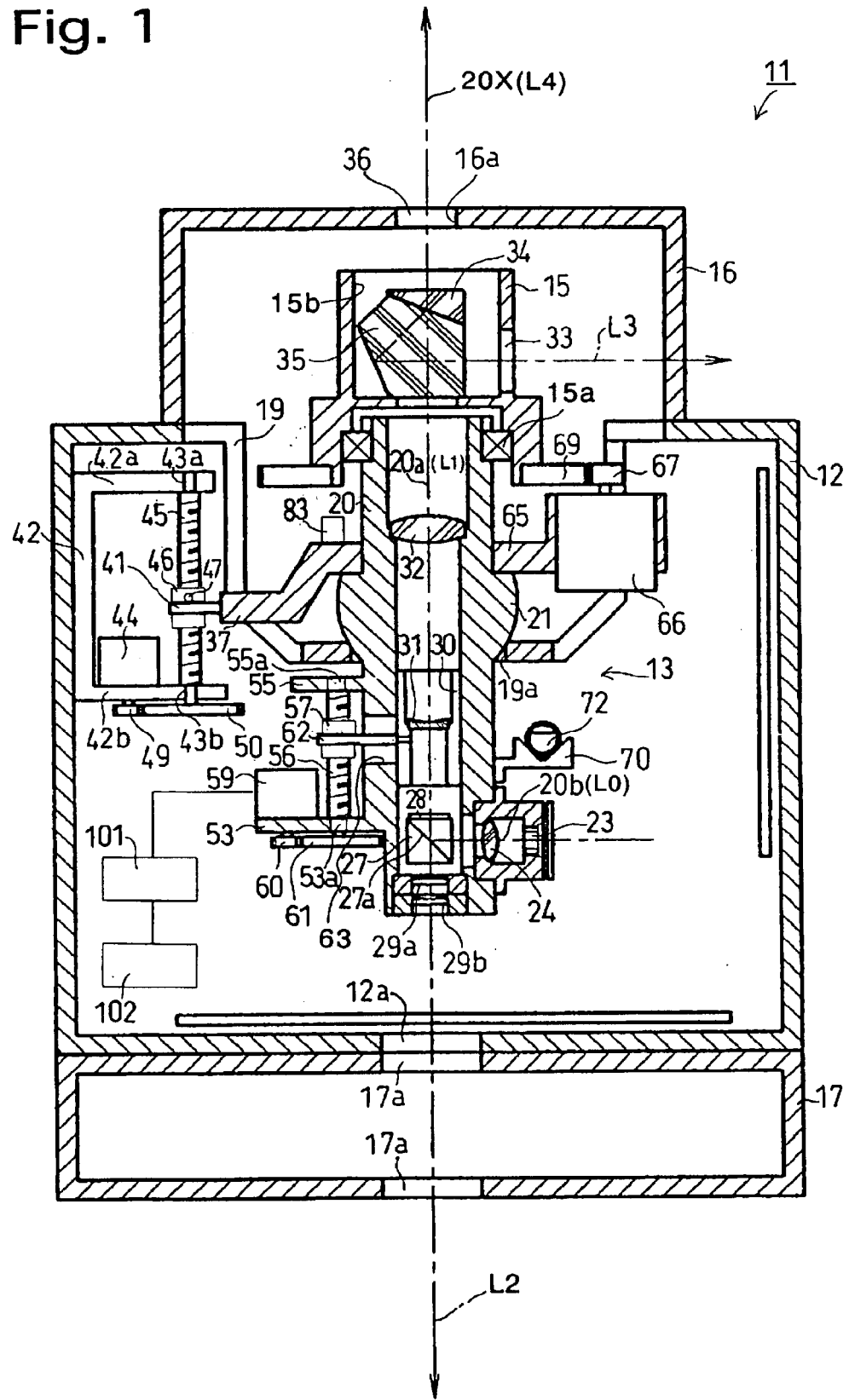
FIG. 1 is a longitudinal sectional view of a laser survey instrument according to the present invention.

Embodiments of the present invention illustrated in the drawings will be described below. FIG. 1 shows a longitudinal sectional view of a laser survey instrument (laser planer) to which the present invention is applied. The laser survey instrument 11 includes a substantially cylindrical housing 12, and a light emitter 13 provided in the housing 12. A cylindrical transparent member 16 which surrounds an upper rotating beam emitting portion (head portion) 15 of the light emitter 13 is secured to the upper end of the housing 12. A battery casing 17 which receives batteries (not shown) therein for driving the laser survey instrument 11 is secured to the lower end of the housing 12.

The housing 12 is provided, on the upper and central portion thereof with a substantially cylindrical sliding movement guide portion 19, and on the lower and central portion thereof with a circular hole 12a. The circular hole 12a is registered with circular holes 17a formed at the central portion of the battery casing 17, so that the laser beam from upward can be emitted outward from the lower end of the survey instrument 11. The sliding movement guide member 19 is provided, on the center portion of the bottom thereof, with a sliding hole 19a.

The light emitter 13 includes a hollow shaft member 20 having a vertically extending axial hole (laser path) 20a, and a rotating beam emitting portion (rotatable head portion) 15 which is rotatably supported on the hollow shaft member 20 by a bearing 15a. The hollow shaft member 20 is provided on its outer surface with a bulged portion 21 defined by part of a spherical surface. The bulged portion 21 makes it possible to tilt the axis 20X of the hollow shaft member 20 (i.e., the rotating beam emitting portion 15) in a desired direction while keeping the spherical surface portion in contact with the sliding hole 19a of the housing 12.

The hollow shaft member 20 is provided on its lower end portion with a laser path 20b perpendicular to the laser path 20a. In the laser path 20b are provided a semiconductor laser (laser source) 23 which emits a visible laser beam along the laser path 20b, and a collimating lens 24 which collimates the laser beam emitted from the semiconductor laser 23 into parallel beam having an elliptical shape in cross section. A polarization beam splitter 27 receives the laser beam emitted from the collimating lens 24 at an intersection of the laser paths 20a and 20b.

Figure 2:
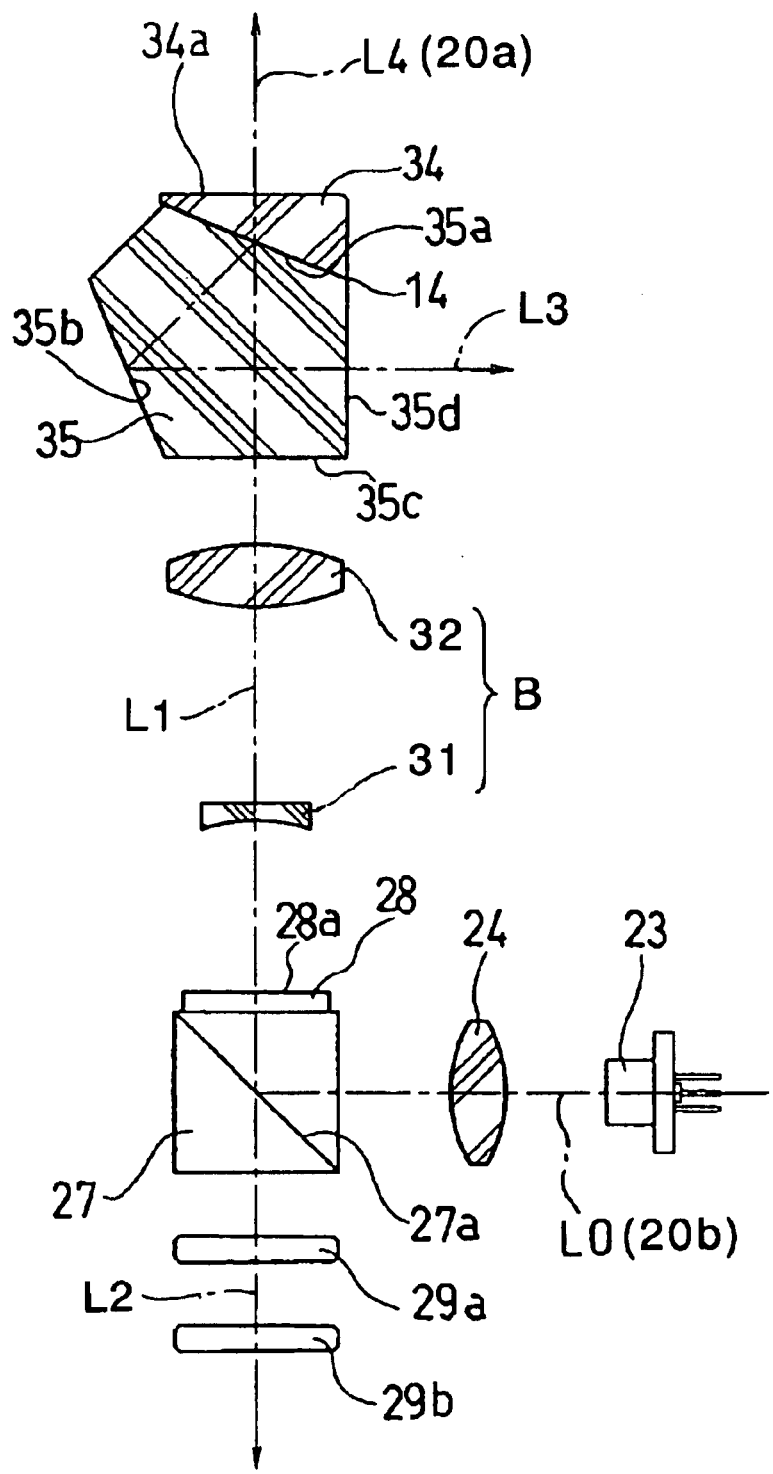
FIG. 2 is an enlarged side view of a laser survey instrument shown in FIG. 1.

The polarization beam splitter 27 is provided with a polarization splitter surface 27a at an angle of 45 degrees with respect to both the laser paths 20a and 20b, as can be seen in FIGS. 1 and 2. A ¼ λ plate 28 is adhered to the upper surface of the polarization beam splitter 27. The ¼ λ plate 28 which rotates the polarization direction of beam incident thereon by 90 degrees is provided on its upper surface with a semi-transparent film 28a whose reflectance is in the range of 10 to 20% and which permits a predetermined amount of laser beam to pass therethrough toward a pentagonal prism 35 and reflects the remaining laser beam toward the polarization beam splitter 27. Wedge-shaped prisms 29a and 29b are provided below the polarization beam splitter 27.

The rotating beam emitting portion 15 has a prism receiving portion 15b coaxial to the hollow shaft member 20, as shown in FIG. 1. The pentagonal prism 35 is secured in the prism receiving portion 15b so as to rotate together with the rotating beam emitting portion 15. As can be seen in FIG. 2, the pentagonal prism 35 has a beam receiving surface 35c perpendicular to the laser path 20a, upon which the laser beam is made incident, a first reflection surface 35a inclined at a predetermined angle with respect to the incident surface 3c, a second reflection surface 35b which reflects the laser beam reflected by the first reflection surface 35a in a direction perpendicular to the rotation axis 20X, and a light emission surface 35d from which the laser beam reflected by the second reflection surface 35b is emitted and which forms a right angle (90 degrees) with respect to the incident surface 3c. The first reflecting surface 35a is provided thereon with a semitransparent film 14 having a predetermined reflectance and a wedge-shaped prism 34 adhered to the semi-transparent film 14. The second reflection surface 35b is coated with an enhanced reflection film of aluminum, or the like, deposited thereon. The wedge-shaped prism 34 is arranged so that the beam emission surface 34a is in parallel with the incident surface 3c of the pentagonal prism 35 whereby the laser beam emitted from the upper emission surface 34a is oriented in the same direction as the rotation axis 20X of the laser path 20a.

The prism receiving portion 15b is provided on its side wall with a light emission window 33 through which the laser beam reflected and deflected by the pentagonal prism 35 and emitted from the light emission surface 35d is emitted outward. The prism receiving portion 15b has an open upper end. A transparent member 36 is fitted in the circular hole 16a of the transparent member 16.

The hollow shaft member 20 is provided with orthogonal drive arms 37 and 39 (FIG. 3) integral therewith, that extend perpendicularly to the axis 20X of the hollow shaft member 20. The drive arms 37 and 39 extend obliquely and downward from the uppermost end of the bulged portion and are provided on their front ends with drive pins 40 and 41 that extend radially with respect to the center of the bulged portion 21 (center of the sphere), respectively.

The housing 12 is provided on its inner wall with a bracket 42 having upper and lower plates 42a and 42b, corresponding to the drive arm 37 and the drive pin 40. The upper plate 42a is provided with a support hole 43a and the lower plate 42b is provided with a support hole 43b opposed to the support hole 43a. Opposite shaft ends of a level adjusting screw 45 are rotatably-fitted in the support holes 43a and 43b. A first level adjusting motor 44 is secured to the lower plate 42b of the bracket 42. The drive shaft of the first level adjusting motor 44 is provided with a pinion 49 secured thereto, which is in mesh with a transmission gear 50 secured to the lower end of the level adjusting screw 45. The level adjusting screw 45 engages with an adjusting nut 46 whose rotation relative to the housing 12 is restricted. The level adjusting screw 45 and the nut 46 constitute a feed screw mechanism. An operation pin 47 secured to the outer peripheral surface of the nut 46 abuts against the drive pin 40 from above.

Figure 3:
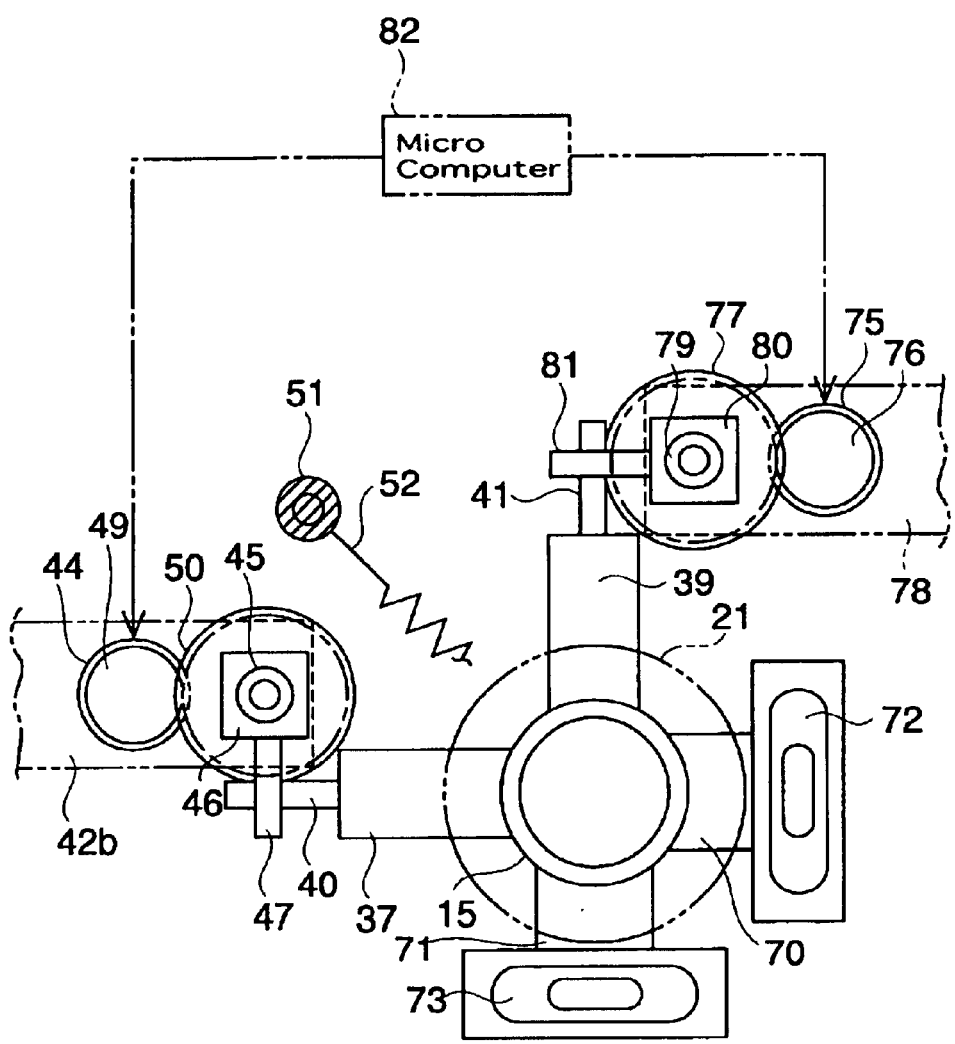
FIG. 3 is a plan view of the main components of a laser survey instrument shown in FIG. 1.

As shown in FIG. 3, the housing 12 is provided on its inner wall with a bracket 78 corresponding to the drive arm 39 and the drive pin 41. The bracket 78 corresponds to the bracket 42. Opposite shaft ends of a level adjusting screw 79 are rotatably fitted in the bracket 78. A pinion 76 secured to a drive shaft of a second level adjusting motor 75 secured to the bracket 78 engages with a transmission gear 77 secured to the lower end of the level adjusting screw 79. The level adjusting screw 79 engages with an adjusting nut 80 whose rotation relative to the housing 12 is restricted. The level adjusting screw 79 and the nut 80 constitute a feed screw mechanism. An operation pin 81 secured to the outer peripheral surface of the nut 80 abuts against the drive pin 41 from above.

The housing 12 is provided on its inner wall with a support projection 51 which is provided at a position on a bisector of the angle defined by the orthogonal drive arms 37 and 39. The hollow shaft member 20 elastically presses the drive pins 40 and 41 which are biased upward with an identical force by means of a tensile spring 52 provided between the support projection 51 and the hollow shaft member 20, against the operation pins 47 and 81 from below. Namely, since the hollow shaft member 20 is biased toward the support projection 51, and with the bulged portion 21 formed on the lower part thereof being supported in the sliding hole 19a, it is possible to optionally adjust the rotation axis 20X of the shaft member 20 by the operation pins 47 and 81 which are moved up and down by means of the drive motors 44 and 75 in accordance with the signals of a micro computer (main controller) 82. Furthermore, the hollow shaft member 20 is provided on its lower end with brackets 70 and 71 that extend in opposite directions to the arms 37 and 39, respectively, as shown in FIG. 3. The brackets 70 and 71 are provided with level detection sensors 72 and 73, respectively, so that the detection signals of the sensors 72 and 73 are sent to the micro computer 82.

The hollow shaft member 20 is provided on its upper portion with an outwardly extending bracket 65 as shown in FIG. 1. A rotation motor 66 is secured to the bracket 65. A pinion 67 secured to the drive shaft of the rotation motor 66 and is in mesh with a transmission gear 69 secured to the outer peripheral surface of the rotating beam emitting portion 15. Consequently, when the rotation motor 66 is driven in accordance with the signal of the micro computer 82, the rotating beam emitting portion 15 is rotated on the hollow shaft member 20 via the pinion 67 and the transmission gear 69. Moreover, a rotation detection sensor 83 which is oriented upward is provided on the opposite side of the upper bracket 65 of the hollow shaft member 20. The rotation detection sensor 83 emits a light beam onto a predetermined pattern (not shown) formed on the under surface of the transmission gear 69 and receives the beam reflected therefrom, and the beam receiving signal of the sensor 83 is sent to the micro computer 82. The micro computer 82 calculates the angular displacement of the rotating beam emitting portion 15 in accordance with the light receiving signal.

A first lens group (movable lens group) 31 having a negative power, and a second lens group 32 having a positive power are provided above the polarization beam splitter 27, in this order from the polarization beam splitter 27 side, within the laser path 20a of the hollow shaft member 20. The first lens group 31 is supported by a cylindrical member 30. The cylindrical member 30 is movable in the optical axis direction relative to the second lens group 32, within the beam path 20a. The first and second lens groups 31 and 32 constitute a beam expander (beam waist position varying optical system) B, wherein the movement of the first lens group 31 in the optical axis direction causes the diameter of the laser beam, emitted from the semiconductor laser 23 and collimated through the collimating lens 24, to be varied.

The hollow shaft member 20 is provided with a pair of upper and lower brackets 55 and 53 that extend outwardly (radially). The brackets 53 and 55 are provided with opposed gear supporting holes 53a and 55a, respectively, in which opposite shaft ends of a lens moving screw 56 are rotatably fitted. The pinion 60 secured to the drive shaft of the lens moving motor 59 secured to the bracket 53 engages with a transmission gear 61 secured to the lower end of the lens moving screw 56. The lens moving screw 56 engages in a lens moving nut 57 which forms, together with the lens moving screw 56, a feed screw mechanism. Moreover, the hollow shaft member 20 is provided with an insertion window 63 which corresponds to the cylindrical member 30, so that a link 62 to which the cylindrical member 30 and the lens moving nut 57 are secured at the opposed ends thereof extends through the insertion window 63. Therefore, it is possible to move the cylindrical member 30 up and down via the feed screw mechanism by driving the lens driving motor 59 in accordance with the signal of the micro computer 82, in order to move the first lens group 31 relative to the second lens group 32 to thereby vary the distance therebetween. Thus, the diameter of the laser beam and the position of the beam waist can be varied.

Figure 4:
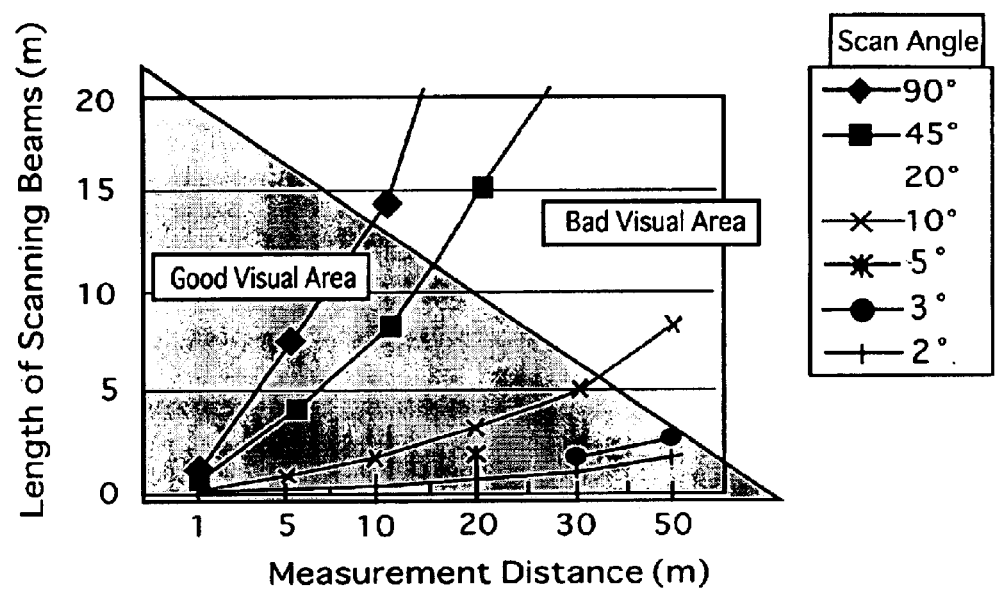
FIG. 4 is a graph showing a relationship between the length of a scan line and a measurement distance range.

The relationships between the length of the laser beam from one end to the other (which will be referred to as a scanning beam length) and the measurement distance when the scanning laser beam, which is reciprocally rotated (scanned), is impinged upon a wall, etc., for each reciprocating-scan angle are as shown in FIG. 4. In FIG. 4, the shaded area represents a good visual portion in which the laser beam can be clearly viewed, whereas the visibility is low in the other area. As can be seen from the graphs shown in FIG. 4, as the scanning beam length increases, the brightness at a long distance is insufficient and the visibility is reduced. Therefore, at a long distance, it is possible to increase the visibility by reducing the reciprocating-scan angle to thereby shorten the scanning beam length. At a short distance, a high visibility is obtained regardless of the reciprocating-scan angle. However, if the reciprocating-scan angle is reduced, the surface area of the measurement reference plane is impractically made small. Therefore, it is preferable that the reciprocating-scan angle be made small at a long distance and large at a short distance.

As mentioned above, it is possible to vary the position of the beam waist of the laser beam by moving the first lens group 31. The position of the first lens group 31 is correlated to the position of the beam waist position, and hence if the position of the first lens group 31 is determined, the beam waist position can be determined accordingly. Namely, the position of the first lens group 31 corresponds to the position of the beam waist. Consequently, if the relationship between the position of the first lens group and the beam waist position is expressed numerically in advance, the beam waist position of the laser beam can be determined by detecting the position of the first lens group 31. Consequently, it is possible to obtain the object distance by detecting the position of the first lens group 31 which is moved to make the object coincident with the beam waist position. In order to make the beam waist position coincident with the object, the first lens group 31 is moved and adjusted to minimize the beam diameter.

In the illustrated embodiment, the reciprocating-scan angle of the laser beam is determined in accordance with the beam waist position. Namely, the reciprocating-scan angle is determined based on the position of the first lens group 31 when the beam waist position corresponds with the object.

The position of the first lens group 31 can be detected directly or indirectly. In the illustrated embodiment, the angular displacement of the lens moving motor 59 is detected in place of the direct detection of the position of the first lens group 31, so that the reciprocating-scan angle of the laser beam can be determined in accordance with the detected angular displacement. Namely, the position of the lens moving motor 59 when the first lens group 31 is at a reference position (e.g., one of the movement extremities) is set to be a reference angular position, so that the angular displacement from the reference angular position is detected to determine the reciprocating-scan angle corresponding thereto. More concretely, as shown in FIG. 5, the angular displacement of the lens moving motor 59 from the reference angular position, corresponding to the beam waist position, i.e., the object distance, is correlated in advance with the reciprocating-scan angle of the rotating beam emitting portion 15, so that the rotating beam emitting portion is moved by the reciprocating-scan angle to scan the object with the beam. With this control, the optimum reciprocating-scan angle of the laser beam can be automatically obtained, so that the reciprocally moving laser beam can be viewed regardless of the distance.

FIG. 6 shows a block diagram of the internal control circuit and the surroundings thereof in the laser survey instrument 11. To the micro computer 82 are connected a lens moving motor control circuit 101 which controls the lens moving motor 59, a drive amount (displacement) measuring circuit 102 which is also connected to the lens moving motor control circuit 101, a laser control circuit 103 which controls the semiconductor laser 23, an automatic leveling circuit 104 which controls the level adjusting motors 44 and 75, and a rotation beam-emitting-portion control circuit (head portion controller) 105 which controls the rotation motor 66. Also, a memory 106 is connected to the micro computer 82, wherein a table which shows a relationship between the angular displacement of the lens moving motor 59 and the reciprocating-scan angle of the rotating beam emitting portion 15 is stored.

The overall operation of the laser survey instrument 11 will be discussed hereinafter. The laser survey instrument 11 is set at a desired position using a tripod. In general, before the adjustment is carried out, the axis (rotation axis 20X) of the rotating beam emitting portion 15 is not identical to the vertical axis, so that the level detection sensors 72 and 73 detect a non-horizontal state. In this state, if a drive switch (not shown) is turned ON, the micro computer 82 drives and rotates the first and second level adjusting motors 44 and 75 via the automatic leveling circuit 104 in accordance with a calculated angle deviation. For instance, if the level adjusting motor 44 is rotated, the level adjusting screw 45 is rotated to move the level adjusting nut 46 up and down. When this movement occurs, the hollow shaft member 20 is rotated about the center of a sphere defined by the bulged portion 21 via the drive pin 40 which is biased by the tensile spring 52 and is elastically pressed against the operation pin 47 of the nut 46. Consequently, the rotating beam emitting portion 15 is inclined with respect to the vertical axis. If the level adjusting motor 75 is rotated, the rotation is transmitted to the level adjusting screw 79, so that the level adjusting nut 46 is moved up and down. Consequently, the rotating beam emitting portion 15 is inclined with respect to the vertical axis, since the drive pin 41 biased by the tensile spring 52 is elastically pressed against the operation pin 81 of the nut 80.

If further leveling operation takes place in accordance with the inclination of the light emitter 13, the detection values from the level detection sensors 72 and 73 approach the reference horizontal axis, so that the angle deviation eventually becomes zero. Consequently, the horizontal position of the light emitter 13 (rotating beam emitting portion 15) is determined by the inclination adjustment, thus completing the leveling operation.

Upon completion of the leveling operation, the drive signal is output from the micro computer 82 through the laser control circuit 103, so that the semiconductor laser 23 begins to emit a laser beam. The laser beam emitted from the semiconductor laser 23 is collimated by the collimating lens 24 into an elliptical shape in cross section, and is thereafter split by the polarization beam splitter 27 into beam L1 traveling upward and beam L2 traveling downward. Assuming that the laser beam L0 incident upon the polarization beam splitter 27 consists of a linearly polarized beam having only an S-polarized light component whose oscillation direction is perpendicular to the incident surface of the polarization beam split surface 27a and having no P-polarized light component, the laser beam L0 is totally reflected by the polarization beam split surface 27a and is deflected upward in the direction by 90 degrees in FIG. 2. Since the ¼ λ plate 28 is adhered to the polarization beam splitter 27 so as to rotate the oscillation direction of the beam by 90 degrees, the laser beam L0 which passes through the ¼ λ plate 28 is converted into circularly polarized beam L1 and travels toward the pentagonal prism 35. The laser beam L1 reflected by the semitransparent film 28a is transmitted again through the ¼ λ plate 28, so that the oscillation direction thereof is changed by 90 degrees. Consequently, the linearly polarized beam L2 having a P-polarized light component oscillating in a direction perpendicular to that of the incident beam is obtained. The linearly polarized beam L2 passes through the polarization beam split surface 27a, travels downward in FIG. 1, passes through the wedge-shaped prisms 29a and 29b, and is emitted downward and outward.

The laser beam L1 traveling upward is transmitted through the first and second lens groups 31 and 32, is transmitted through the incident surface 3c of the pentagonal prism 35, is reflected successively by the first and second reflection surfaces 35a and 35b, so that the direction of the laser beam is changed by 90 degrees, and is emitted outward from the emission surface 35d in the substantially horizontal direction. The component of the laser beam L1 passing through the first reflection surface 35a is transmitted through the half mirror surfaces defined by the first reflection surface 35a and the wedge-shaped prism 34 without changing the direction and is emitted upward as laser beam L4 coaxial to the laser beam L1.

To minimize the diameter of the beam on the object, an operation lever or operation button (not shown), etc., is actuated to rotate the lens moving motor 59 to adjust the position of the first lens group 31. Namely, the beam waist position of the laser beam is made coincident with the object. Whether or not the beam waist position corresponds with the object is visually checked by the operator(s). If the object distance is small, the operator can judge whether or not the beam waist position corresponds with the object, and if the object is located at a large object distance, it is possible for another operator near the object to visually check the same. Upon completion of the adjustment, the micro computer 82 acts as an angular position detector by detecting the angular displacement of the lens moving motor 59 via the displacement measuring circuit 102, so that the displacement range (reciprocating-scan angle) of the rotation motor 66 can be set by the micro computer (reciprocating-scan angle setting device) 82 based on the detection result using the table in the memory, which shows the angular displacement of the lens moving motor 59 and the reciprocating-scan angle of the rotating beam emitting portion 15. Consequently, the rotation motor 66 is reciprocally rotated within the set displacement range. Since the rotating beam emitting portion 15 begins rotation in the forward and reverse directions about the vertical rotation axis 20X, a horizontal reference plane within a predetermined angular range is drawn by the laser beam L3 emitted from the pentagonal prism 35 in the horizontal direction.

In the illustrated embodiment, the second lens group 32 is immovable and the first lens group 31 is movable relative to the second lens group. Alternatively, it is possible to make the first lens group 31 immovable and make the second lens group 32 movable relative to the immovable first lens group 31 to constitute a beam expander.

Moreover, although the position of the first lens group 31 is detected in accordance with the angular displacement of the lens moving motor 59 from the reference position, so that the reciprocating-scan angle can be set based on the angular displacement in the illustrated embodiment, it is possible to detect the position of the first lens group 31 based on the angular displacement of the transmission gear (rotating member) 61 or the displacement of the link (linear movement member) 62, etc., wherein the displacement is correlated to the reciprocating-scan angle of the rotating beam emitting portion 15.

Furthermore, although the reciprocating-scan angle of the rotating beam emitting portion 15 corresponding to the angular displacement of the lens moving motor 59 is calculated in advance and is stored in the memory 106, in the illustrated embodiment, it is possible to calculate the reciprocating-scan angle of the rotating beam emitting portion 15 based on the angular displacement of the lens moving motor 59.

In the embodiment mentioned above, a table is used; however, as an alternative, it is possible for the micro computer (reciprocating-scan angle setting device) 82 to calculate a reciprocating-scan angle of the rotating beam emitting portion (rotatable head portion) 15 based on the position data of the movable lens group of the beam waist position varying optical system in accordance with a predetermined relationship between the position of the movable lens group and the reciprocating-scan angle of the head portion. This predetermined relationship can stored in the memory 106.

According to the present invention, a laser survey instrument can be provided in which the reciprocating-scan angle of the laser beam can be automatically varied in accordance with the laser beam distance (beam waist position) to obtain an optimum scan angle.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A laser survey instrument comprising:

a laser source;

a beam waist position varying optical system having a movable lens group through which a laser beam emitted from the laser source passes, so that the movement of the movable lens group in an optical axis direction causes the beam waist position of the laser beam to vary;

a rotatable head portion from which said laser beam transmitted through the beam waist position varying optical system is emitted;

a reciprocating-scan angle setting device for setting a reciprocating-scan angle of the rotatable head portion in accordance with position data of the movable lens group of the beam waist position varying optical system; and a head portion controller for reciprocally moving the head portion by said reciprocating-scan angle.

2. A laser survey instrument according to claim 1, wherein said reciprocating-scan angle setting device utilizes a table stored in a memory in which a relationship between the position of the movable lens group of the beam waist position varying optical system and the reciprocating-scan angle of the head portion controller is stored, so that a corresponding reciprocating-scan angle can be selected based on the position data of the movable lens group.

3. A laser survey instrument according to claim 1, wherein said reciprocating-scan angle setting device calculates a reciprocating-scan angle of the head portion based on the position data of the movable lens group of the beam waist position varying optical system in accordance with a predetermined relationship between the position of the movable lens group and the reciprocating-scan angle of the head portion, said predetermined relationship being stored in a memory.

4. A laser survey instrument according to claim 1, wherein said beam waist position varying optical system comprises a motor, and a feed screw mechanism which is driven by said motor to move said movable lens group.

5. A laser survey instrument according to claim 4, wherein the position data of said movable lens group of the beam waist position varying optical system is detected in accordance with one of the rotational angular displacement of said motor and the rotational angular displacement of a rotating member rotated by said motor.

6. A laser survey instrument according to claim 1, wherein said beam waist position varying optical system is accommodated in a hollow shaft member; and wherein said rotatable head portion is provided at the top of said hollow shaft member.

7. A laser survey instrument according to claim 1, wherein said beam waist position varying optical system comprises a positive lens group which is immovable, and a negative lens group which is movable.

8. A laser survey instrument according to claim 1, wherein said beam waist position varying optical system comprises a positive lens group which is movable and a negative lens group which is immovable.

9. A laser survey instrument comprising:

a hollow shaft member having an axis;

a rotatable head portion provided at the top of said hollow shaft member to be rotatable about the axis of the hollow shaft member;

a beam expander accommodated in said hollow shaft member, said beam expander comprising at least a positive lens group and a negative lens group, wherein one of said positive and negative lens groups comprises a movable lens group which is movable in the optical axis direction;

a laser source to emit a laser beam through said beam expander and rotatable head portion, wherein said laser beam exits from said rotatable head portion in a direction perpendicular to the axis of the hollow shaft member;

a position detector which detects the position of said movable lens group of the beam expander;

a reciprocating-scan angle setting device for setting the reciprocating-scan angle of the rotatable head portion in accordance with position data of the movable lens group detected by said position detector; and a head portion controller for reciprocally moving the head portion by a set reciprocating-scan angle set by said reciprocating-scan angle setting device.

10. A laser survey instrument according to claim 9, wherein said reciprocating-scan angle setting device utilizes a table stored in a memory in which a relationship between the position of the movable lens group of the beam expander and the reciprocating-scan angle of the head portion controller is stored, so that a corresponding reciprocating-scan angle can be selected based on the position data of the movable lens group.

11. A laser survey instrument according to claim 9, wherein said movable lens group of the beam expander is driven by a motor and a feed screw mechanism.

12. A laser survey instrument according to claim 11, wherein the position detector of said movable lens comprises an annular position detector which detects one of the rotational angular displacement of said motor and the rotational angular displacement of a rotating member rotated by said motor.

* * * * *